(12) United States Patent
Chiang et al.

(10) Patent No.: US 10,223,778 B2
(45) Date of Patent: Mar. 5, 2019

(54) IMAGE CONTRAST ENHANCEMENT METHOD AND APPARATUS THEREOF

(71) Applicant: REALTEK SEMICONDUCTOR CORP., Hsinchu (TW)

(72) Inventors: Hao-Tien Chiang, Taipei (TW); Tsung-Hsuan Li, Taichung (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 14 days.

(21) Appl. No.: 15/476,209

(22) Filed: Mar. 31, 2017

(65) Prior Publication Data

US 2017/0301075 A1 Oct. 19, 2017

(30) Foreign Application Priority Data

Apr. 13, 2016 (TW) .............................. 105111495 A (51) Int. Cl.
*G06T 5/40* (2006.01)
*G06T 11/00* (2006.01)

(52) U.S. Cl.
CPC .............. *G06T 5/40* (2013.01); *G06T 11/001* (2013.01); *G06T 2207/10024* (2013.01); *G06T 2207/20172* (2013.01)

(58) Field of Classification Search
CPC ..................... G06T 5/40; G06T 11/001; G06T 2207/10024; G06T 2207/20172
See application file for complete search history.

(56) References Cited

U.S. PATENT DOCUMENTS

| 6,163,621 | A  | * | 12/2000 | Paik ................... G06K 9/00442 382/169 |
| 8,755,628 | B2 |   | 6/2014 | Fang et al. |
| 8,774,554 | B1 | * | 7/2014 | Winn ........................ G06T 5/40 382/168 |
| 2005/0058343 | A1 | * | 3/2005 | Nenonen ................. G06T 5/004 382/169 |
| 2005/0104974 | A1 | * | 5/2005 | Watanabe ............ H04N 1/6027 348/222.1 |
| 2010/0040300 | A1 | * | 2/2010 | Kang ................. G06K 9/00664 382/255 |

(Continued)

FOREIGN PATENT DOCUMENTS

TW 201032578 A1 9/2010

OTHER PUBLICATIONS

Yadav et al. "Fog Removal Techniques from Images: A Comparative Review and Future Directions" International Conference on Signal Propagation and Computer Technology, Jul. 12, 2014, pp. 44-52.*

(Continued)

*Primary Examiner* — Jon Chang
(74) *Attorney, Agent, or Firm* — Li & Cai Intellectual Property (USA) Office (57) ABSTRACT

An image contrast enhancement method and an apparatus thereof are disclosed, which calculate the degree of influencing the clarity according to the influence feature (e.g., heavy fog, dust, smoke, or etc.) in the image, and then adjust the brightness of the pixels corresponding to features of influencing the clarity according to the degree, thereby enhancing image contrast and removing phenomenon of influencing the clarity in the image.

10 Claims, 9 Drawing Sheets

(56) References Cited

U.S. PATENT DOCUMENTS

2011/0135200 A1* 6/2011 Chen .................. G06T 5/003
382/167
2014/0140619 A1* 5/2014 Mukhopadhyay ........ G06T 5/40
382/167

OTHER PUBLICATIONS

Lei et al. "A Fast Algorithm for Foggy Image Contrast Enhancement." International Conference on Transportation, Mechanical, and Electrical Engineering, Dec. 16, 2018, pp. 1705-1708.*
Wang et al. "Haze Detection and Haze Degree Estimation Using Dark Channels and Contrast Histograms." 10th International Conference on Information, Communications and Signal Processing, Dec. 2, 2015, 5 pages.*
Tzu-Cheng Jen, et al;, "Image Contrast Enhancement Based on Intensity-Pari Disctribution", 2005 IEEE.
Kaiming He, et al., "Single Image Haze Removal Using Dark Channel Prior", IEEE Transactions on Pattern Analysis and Machine Intelligence, vol. 33, No. 12, Dec. 2011.

* cited by examiner

IMAGE CONTRAST ENHANCEMENT METHOD AND APPARATUS THEREOF

BACKGROUND

1. Technical Field

The present disclosure relates to an image contrast enhancement method and an apparatus thereof, in particular, to an image contrast enhancement method and an apparatus thereof, for removing blocks influencing the clarity in the image.

2. Description of Related Art

Generally speaking, the enhancement of the image contrast is usually adopted by histogram equalization. However, this traditional method causes a bad contrast ratio and an unnatural image, especially, when used in heavy fog, clouds and mists in the mountains, dust, smoke, or etc. Using the histogram equalization does not usually get a better effect of enhancing the image contrast.

Therefore, when simultaneously enhancing the image contrast and also removing the influence of heavy fog, clouds and mists in the mountains, dust, or smoke in the image, can improve the clarity in the image.

SUMMARY

Accordingly, exemplary embodiments of the present disclosure provide an image contrast enhancement method and an apparatus thereof, which can simultaneously enhance the image contrast and remove phenomenon influencing the clarity in the image (e.g., heavy fog, dust, smoke, or etc).

An exemplary embodiment of the present disclosure provides an image contrast enhancement method, adapted for an image contrast enhancement apparatus, and used for adjusting each pixel in an input image, to enhance the contrast of the input image. The image contrast enhancement method includes the following steps: receiving each pixel in the input image; sequentially estimating a degree of low contrast of a corresponding pixel according to a pixel feature of each pixel, and converting the degree of low contrast into an adjustment weight by an increasing function; calculating a plurality of brightness values and a plurality of adjustment values corresponding to the brightness values for each pixel according to a brightness relationship and the adjustment weight of the corresponding pixel, to generate a brightness distribution histogram of each pixel, wherein the brightness relationship is a relationship of the corresponding pixel and adjacent pixels around the corresponding pixel, and the brightness distribution histogram indicates the relationship between the brightness values and the adjustment values; generating a total brightness distribution histogram by accumulating the adjustment values corresponding to the same brightness value in each brightness distribution histogram, wherein the total brightness distribution histogram indicates the relationship between the brightness values and the accumulated adjustment values; according to the total brightness distribution histogram, for each brightness value, summing all adjustment values corresponding to the brightness values equal to and less than the brightness value, and taking a summed result as a summed adjustment value corresponding to the brightness value; adjusting an plurality of output pixel values corresponding to the brightness values according to the summed adjustment values, to generate an image histogram, wherein the image histogram indicates the relationship between the brightness values and the output pixel values; and mapping the brightness value of each pixel into one brightness value of the image histogram and outputting the corresponding output pixel values.

An exemplary embodiment of the present disclosure provides an image contrast enhancement apparatus, used for adjusting each pixel in an input image, to enhance the contrast of the input image. The image contrast enhancement apparatus includes an image capture device and an image processor. The image capture device receives the input image and captures a plurality of pixels in the input image. The image processor is electrically connected to the image capture device. The image processor is configured to execute the following steps: receiving each pixel in the input image; sequentially estimating a degree of low contrast of a corresponding pixel according to a pixel feature of each pixel, and converting the degree of low contrast into an adjustment weight by an increasing function; calculating a plurality of brightness values and a plurality of adjustment values corresponding to the brightness values for each pixel according to a brightness relationship and the adjustment weight of the corresponding pixel, to generate a brightness distribution histogram of each pixel, wherein the brightness relationship is a relationship of the corresponding pixel and adjacent pixels around the corresponding pixel, and the brightness distribution histogram indicates the relationship between the brightness values and the adjustment values; generating a total brightness distribution histogram by accumulating the adjustment values corresponding to the same brightness value in each brightness distribution histogram, wherein the total brightness distribution histogram indicates the relationship between the brightness values and the accumulated adjustment values; according to the total brightness distribution histogram, for each brightness value, summing all adjustment values corresponding to the brightness values equal to and less than the brightness value, and taking a summed result as a summed adjustment value corresponding to the brightness value; adjusting an plurality of output pixel values corresponding to the brightness values according to the summed adjustment values, to generate an image histogram, wherein the image histogram indicates the relationship between the brightness values and the output pixel values; and mapping the brightness value of each pixel into one brightness value of the image histogram and outputting the corresponding output pixel values.

To sum up, the exemplary embodiments of the present disclosure provide an image contrast enhancement method and an apparatus thereof, which calculate an image histogram according to features of some phenomena influencing the clarity of the image, such as heavy fog, dust, smoke, or etc., and then adjusting each pixel according to the image histogram to output the corresponding output pixel values.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides an image contrast enhancement method and an apparatus thereof, which calculates the degree of influencing the clarity according to features of some phenomena influencing the clarity of the image, such as heavy fog, dust, smoke, or etc., and then adjusts the brightness of the pixels corresponding to features influencing the clarity according to the degree, thereby enhancing image contrast and removing phenomena influencing the clarity in the image. The image contrast enhancement method and an apparatus thereof provided in the exemplary embodiment of the present disclosure will be described in the following paragraph.

Figure 1:
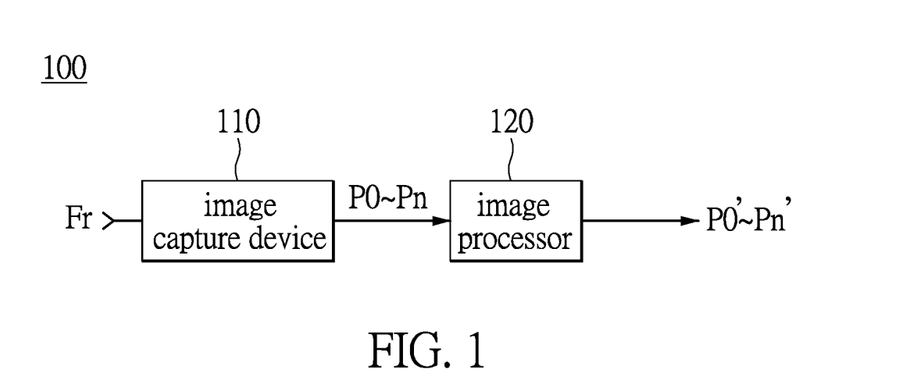
FIG. 1 shows a block diagram of an image contrast enhancement apparatus according to an exemplary embodiment of the present disclosure.

Firstly, please refer to FIG. 1, which shows a block diagram of an image contrast enhancement apparatus according to an exemplary embodiment of the present disclosure. As shown in FIG. 1, the image contrast enhancement apparatus 100 is used for adjusting pixels P0-Pn in an input image Fr, to enhance the contrast of the input image Fr and to output the adjusted output pixel values P0'-Pn'. In the present disclosure, the image contrast enhancement apparatus 100 can be a smart phone, a video recorder, a tablet computer, a notebook, or other electronic apparatus needed to execute the image contrast enhancement. The present disclosure is not limited thereto.

The image contrast enhancement apparatus 100 includes an image capture device 110 and an image processor 120. As shown in FIG. 1, the image capture device 110 receives the input image Fr and captures the pixels P0-Pn in the input image Fr in sequence. More specifically, the image capture device 110 captures sequential images, and the input image Fr is one of the sequential images. The input image Fr is composed of pixels P0-Pn.

Figure 3A:
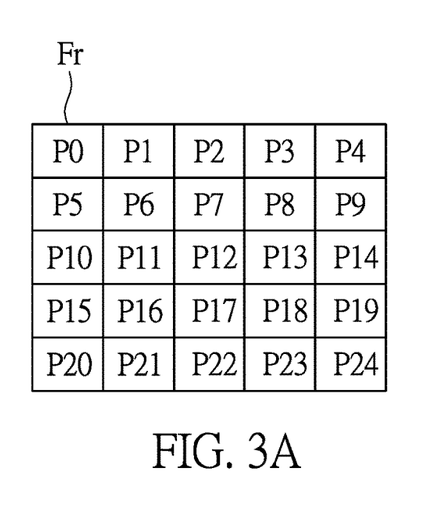
FIG. 3A shows a block diagram of the positions of pixels P12 and P13 in the image according to an exemplary embodiment of the present disclosure.

The image processor 120 is electrically connected to the image capture device 110, and is configured to execute the following steps, to sequentially adjust pixels P0-Pn according to features influencing the clarity in the input image Fr, thereby enhancing image contrast and removing features influencing the clarity in the image Fr. For the convenience in the description, the following description is based on the example of the pixel P12 in the input image Fr, as shown in FIG. 3A. A person skilled in the art should be able to infer the execution steps of adjusting each pixel P0-Pn from the execution steps of adjusting the pixel P12.

Figure 2:
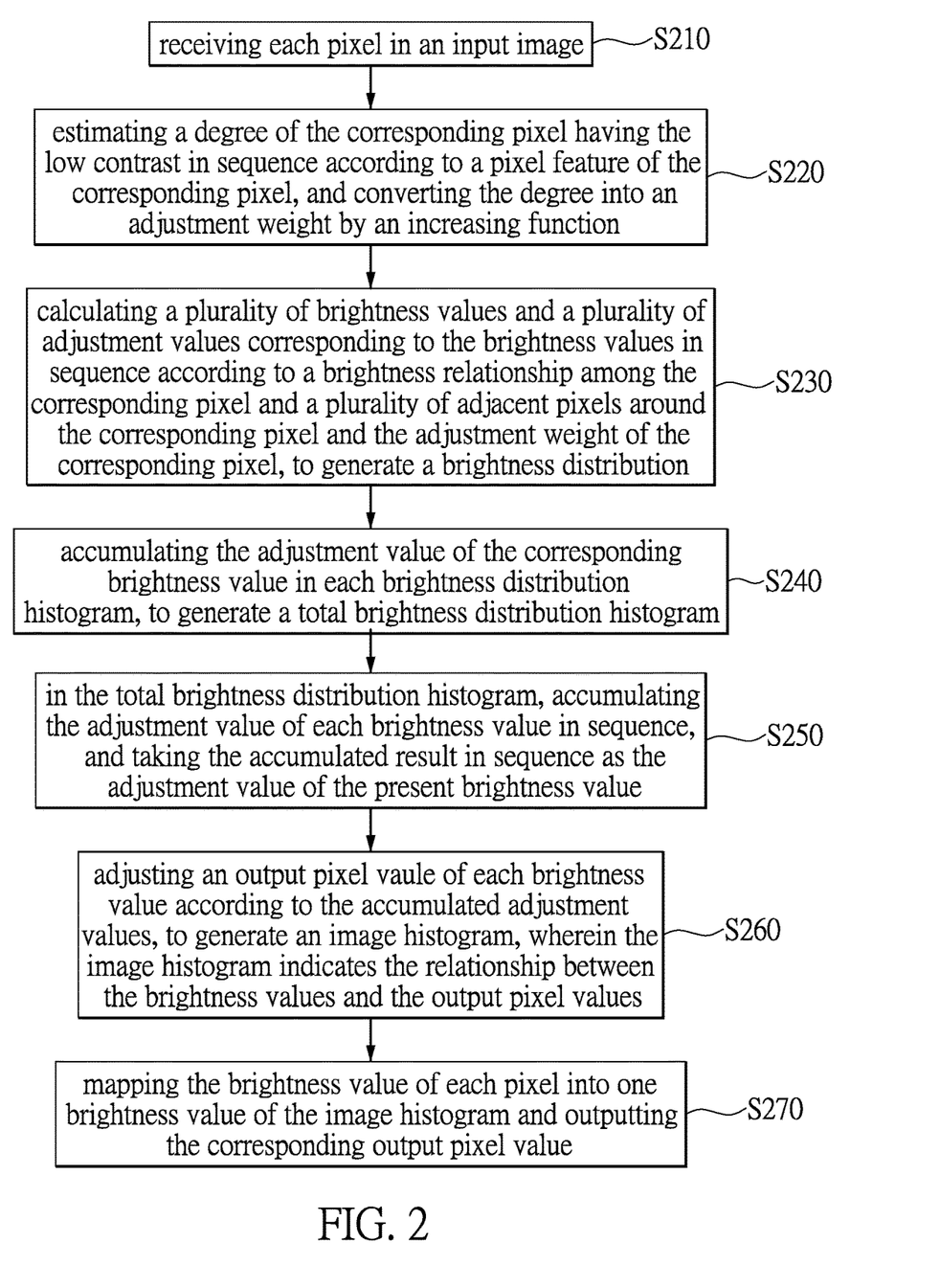
FIG. 2 shows a flowchart of an image contrast enhancement method according to an exemplary embodiment of the present disclosure.

Please refer to FIGS. 1-2, FIG. 2 shows a flowchart of an image contrast enhancement method according to an exemplary embodiment of the present disclosure. Firstly, the image processor 120 receives each pixel P0-Pn in the input image Fr, to further analyze the features influencing the clarity in the input image Fr (step S210).

The features influencing the clarity are, for example, an image having heavy fog, dust, or smoke, which belong to the lower contrast portion in the input image Fr. Therefore, the image processor 120 further analyzes the relationship among the pixels P0-Pn in the input image Fr. The image processor 120 sequentially estimates a degree of low contrast of a corresponding pixel according to a pixel feature of each pixel, and converts the degree of low contrast into an adjustment weight by an increasing function (step S220). Taking FIG. 3A as an example, the input image Fr is a 5×5 image and is composed of the pixels P0-P24. The image processor 120 respectively estimates a degree of low contrast of each pixel starting from the pixel P0, and then converts the degree of low contrast of each pixel P0-P24 into the adjustment weight.

More specifically, the pixel feature is the color relationship between the corresponding pixel and the adjacent pixels around the corresponding pixel. At present, the image processor 120 converts the corresponding pixel and the adjacent pixels into an RGB format. Then the image processor 120 selects a minimum red pixel, a minimum green pixel, and a minimum blue pixel from the corresponding pixel and the adjacent pixels. Then the image processor 120 selects a minimum value from the minimum red pixel, the minimum green pixel, and the minimum blue pixel, and takes the minimum value as the degree of low contrast of the corresponding pixel.

Figure 3B:
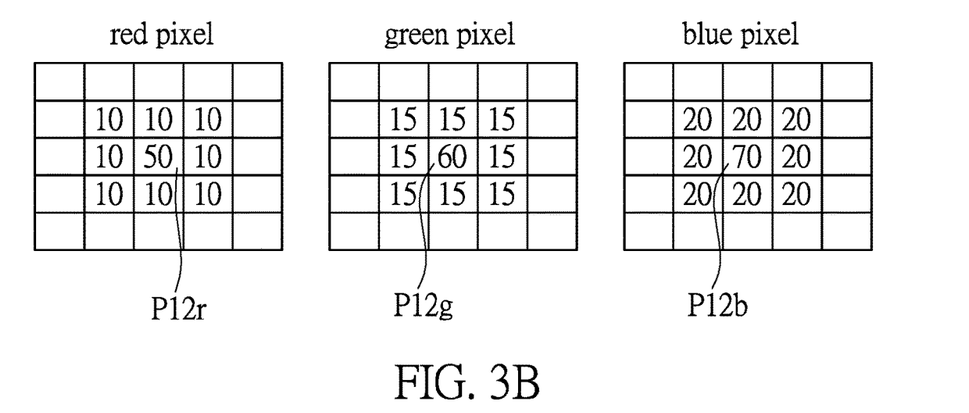
FIG. 3B shows a block diagram of converting the pixel P12 and its adjacent pixels into an RGB format according to an exemplary embodiment of the present disclosure.

Taking the pixel P12 of FIG. 3A as an example, please refer to FIGS. 3A and 3B, the adjacent pixels around the pixel P12 are P6-P8, P11, P13, and P16-P18. Which adjacent pixels around the pixel can be chosen by the actual conditions, and is not be limited thereto. Firstly, the image processor 120 converts the pixel P12, and the adjacent pixels P6-P8, P11, P13, and P16-P18 into the RGB format. As shown in FIG. 3B, the red pixel P12r of the pixel P12 is 50. The red pixels of the adjacent pixels P6-P8, P11, P13, and P16-P18 are 10. The green pixel P12g of the pixel P12 is 60 and the green pixels of the adjacent pixels P6-P8, P11-P13, and P16-P18 are 15. The blue pixel P12b of the pixel P12 is 70 and the blue pixels of the adjacent pixels P6-P8, P11-P13, and P16-P18 are 20. Next, the image processor 120 selects the minimum red pixel (i.e., 10), the minimum green pixel (i.e, 15), and the minimum blue pixel (i.e, 20). Then the image processor 120 selects the minimum value (i.e, 10) and takes the minimum value (i.e, 10) as the degree of low contrast of the corresponding pixel.

The pixel features of the pixel can be set by the actual conditions, and should not be limited thereto. After getting the degree of low contrast of the pixel P12, the image processor 120 converts the value 10 taken as the degree of low contrast into the adjustment weight by an increasing function. In the present disclosure, the converted adjustment weight is 3. The increasing function can be set by the actual conditions, and should not be limited thereto.

After getting the adjustment weight (step S220), the image processor 120 calculates a plurality of brightness values and a plurality of adjustment values corresponding to the brightness values for each pixel according to a brightness relationship and the adjustment weight of the corresponding pixel, to accordingly generate a brightness distribution histogram of each pixel. The brightness relationship is a relationship of the corresponding pixel and adjacent pixels around the corresponding pixel. The brightness distribution histogram indicates the relationship between the brightness values and the adjustment values (step S230).

Figure 4A:
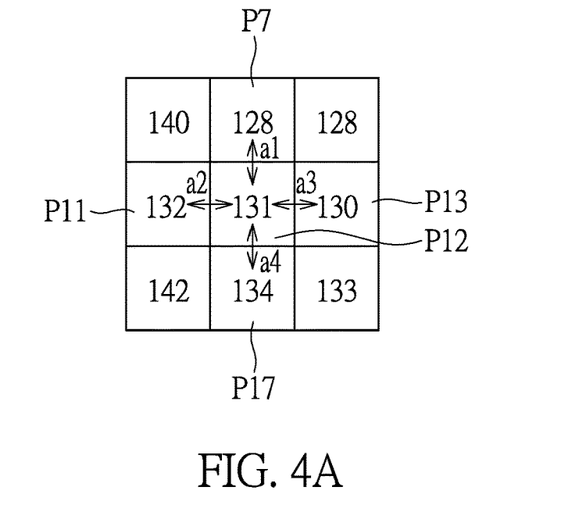
FIG. 4A shows a block diagram of the brightness value of the pixel P12 and its adjacent pixels according to an exemplary embodiment of the present disclosure.

More specifically, in the step of calculating the brightness values and the adjustment values of the corresponding brightness values, the image processor 120 firstly generates a plurality of brightness differences, and each brightness difference comprises the corresponding pixel and one of its adjacent pixels. Then the image processor 120 captures the brightness value of the corresponding pixel and the brightness values of its adjacent pixels. Taking FIG. 4A as an example, FIG. 4A shows the brightness values of the pixel P12 and of its adjacent pixels. In the present disclosure, the adjacent pixels are P7, P11, P13, and P17, and can be set by the actual conditions. The present disclosure is not limited thereto. Therefore, the pixel P12 and the adjacent pixels P7, P11, P13, and P17 respectively compose four brightness differences a1, a2, a3, and a4. The brightness values of the pixel P12 and of its adjacent pixels P7, P11, P13, and P17 are 131, 128, 132, 130, and 134.

Next, in each brightness difference, the image processor 120 takes the smaller brightness value as a start value, takes the larger brightness value as an end value. Then the image processor 120 finds a brightness range formed by the start value and the end value in the brightness distribution histogram. Carrying on with the example above and referring to FIGS. 4A and 4B, the start value and the end value in the brightness difference a1 are 128 and 131. The brightness range Ra1 is formed by the brightness values 128 and 131 in the brightness distribution histogram HTgram1. Similarly, the start value and the end value in the brightness difference a2 are 131 and 132. The brightness range Ra2 is formed by the brightness values 131 and 132 in the brightness distribution histogram HTgram1. Similarly, the start value and the end value in the brightness difference a3 are 130 and 131. The brightness range Ra3 is formed by the brightness values 130 and 131 in the brightness distribution histogram HTgram1. Similarly, the start value and the end value in the brightness difference a4 are 131 and 134. The brightness range Ra4 is formed by the brightness values 131 and 134 in the brightness distribution histogram HTgram1.

Figure 4B:
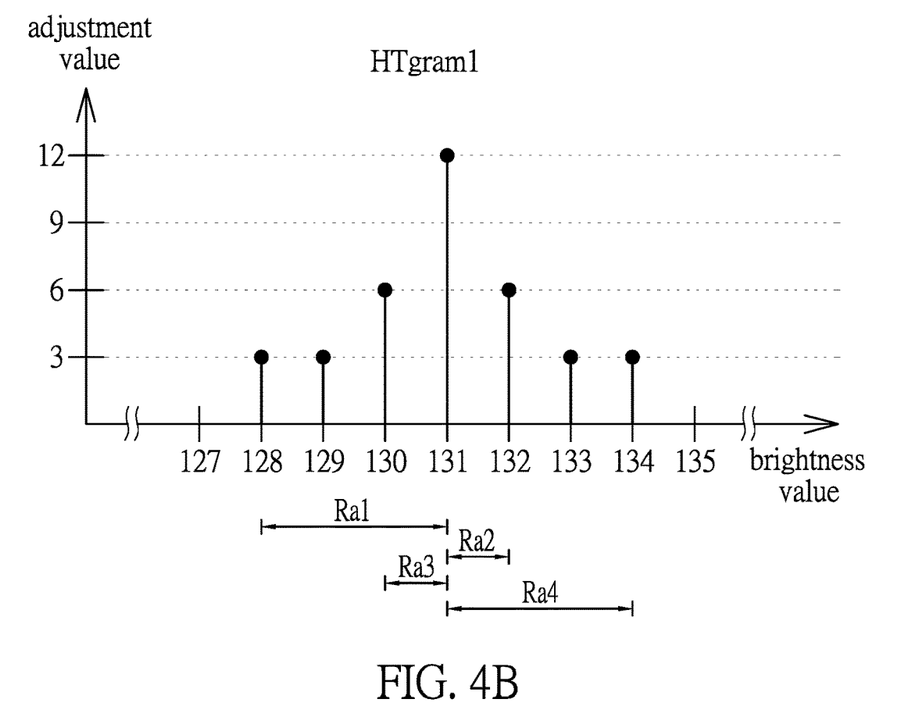
FIG. 4B shows a block diagram of a brightness distribution histogram of the pixel P12 according to an exemplary embodiment of the present disclosure.

Next, the image processor 120 respectively distributes the adjustment weight of the corresponding pixel to each brightness value in each brightness range. Carrying on with the example above, the adjustment weight of the pixel P12 is converted to 3. The image processor 120 distributes the adjustment weight of the pixel P12 to the brightness values 128-131 in the brightness range Ra1 (i.e, the adjustment values corresponding to the brightness values 128-131 add 3); distributes the adjustment weight of the pixel P12 to the brightness values 131-132 in the brightness range Ra2 (i.e, the adjustment values corresponding to the brightness values 131-132 add 3); distributes the adjustment weight of the pixel P12 to the brightness values 130-131 in the brightness range Ra3 (i.e, the adjustment values corresponding to the brightness values 130-131 add 3); and distributes the adjustment weight of the pixel P12 to the brightness values 131-134 in the brightness range Ra4 (i.e, the adjustment values corresponding to the brightness values 131-134 add 3). Therefore, the brightness values 128-134 respectively correspond to the added adjustment values 3, 3, 6, 12, 6, 3, 3, as shown in FIG. 4B of pixel P12 of the brightness distribution histogram HTgram1.

Figure 5A:
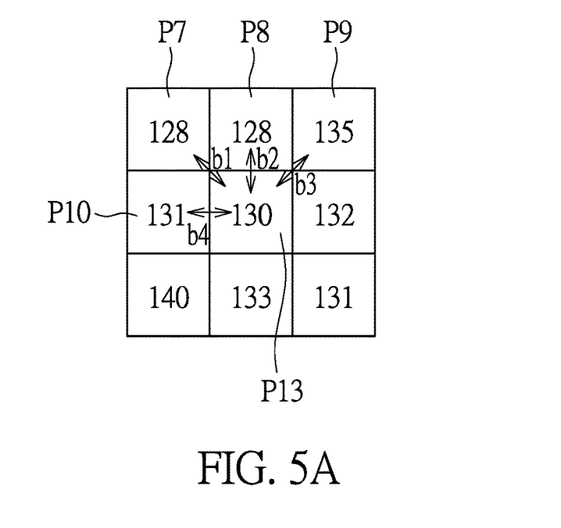
FIG. 5A shows a block diagram of the brightness value of the pixel P13 and its adjacent pixels according to an exemplary embodiment of the present disclosure.
Figure 5B:
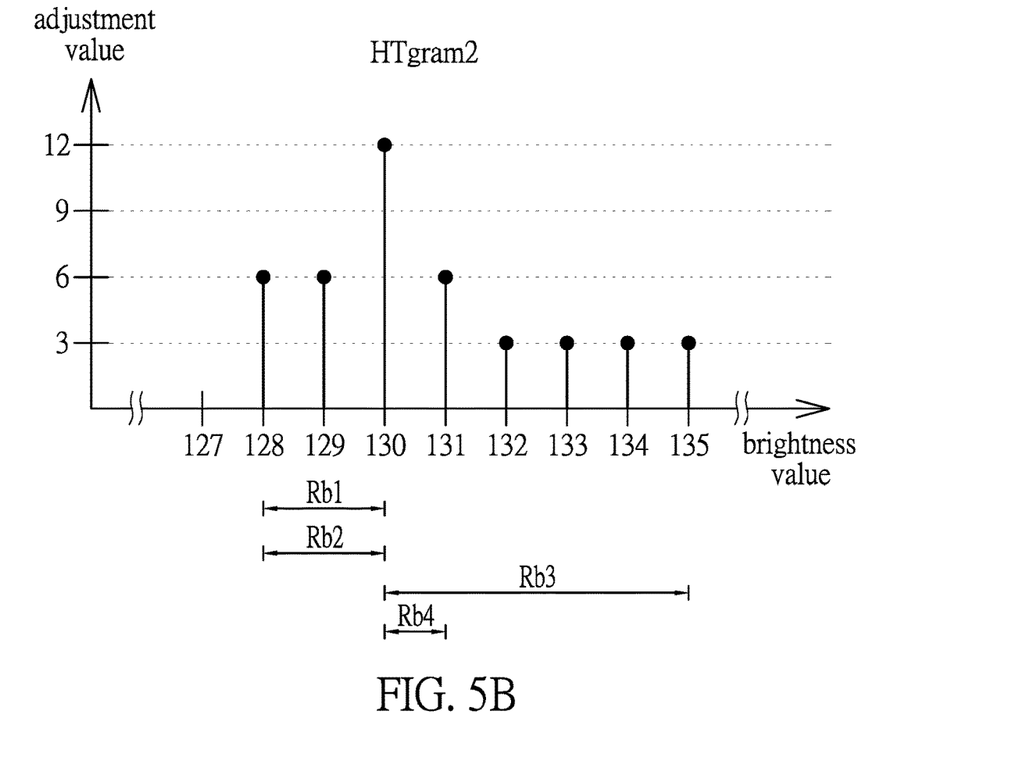
FIG. 5B shows a block diagram of a brightness distribution histogram of the pixel P13 according to an exemplary embodiment of the present disclosure.

For another example, as shown in FIGS. 5A and 5B, the pixel P13 and the adjacent pixels P7-P10 respectively compose four brightness differences b1, b2, b3, and b4. The brightness values of the pixel P13 and of its adjacent pixels P7-P10 are 130, 128, 128, 135, and 131. In the brightness difference b1, the brightness range Rb1 forming by the brightness values 128 and 130 in the brightness distribution histogram HTgram2. In the brightness difference b2, the brightness range Rb2 forming by the brightness values 128 and 130 in the brightness distribution histogram HTgram2. In the brightness difference b3, the brightness range Rb3 forming by the brightness values 130 and 135 in the brightness distribution histogram HTgram2. In the brightness difference b4, the brightness range Rb4 forming by the brightness values 130 and 131 in the brightness distribution histogram HTgram2. Carrying on with the example above, the adjustment weight of the pixel P13 is converted to 3. The image processor 120 distributes the adjustment weight of the pixel P13 to the brightness values 128-130 in the brightness range Rb1 (i.e, the adjustment values corresponding to the brightness values 128-130 add 3); distributes the adjustment weight of the pixel P13 to the brightness values 128-130 in the brightness range Rb2 (i.e, the adjustment values corresponding to the brightness values 128-130 add 3); distributes the adjustment weight of the pixel P13 to the brightness values 130-135 in the brightness range Rb3 (i.e, the adjustment values corresponding to the brightness values 130-135 add 3); and distributes the adjustment weight of the pixel P13 to the brightness values 130-131 in the brightness range Rb4 (i.e, the adjustment values corresponding to the brightness values 130-131 add 3) Therefore, the brightness values 128-135 respectively correspond to the added adjustment values 6, 6, 12, 6, 3, 3, 3, 3, as shown in FIG. 5B of pixel P13 of the brightness distribution histogram HTgram2.

Figure 6A:
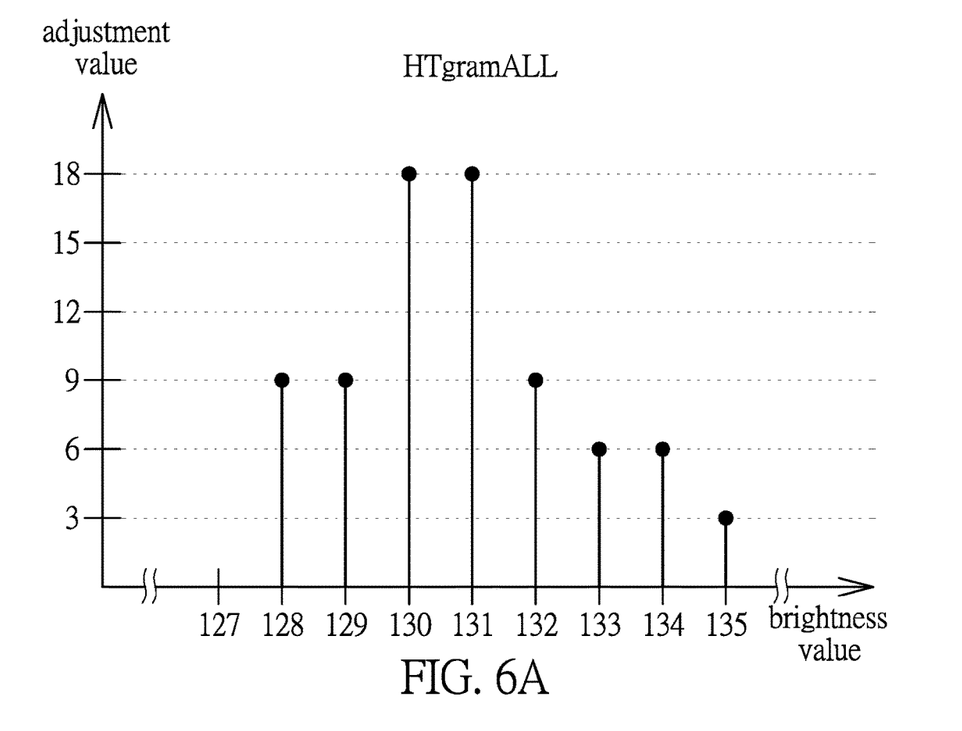
FIG. 6A shows a block diagram of a total brightness distribution histogram of the pixels P12 and P13 according to an exemplary embodiment of the present disclosure.

After generating the brightness distribution histogram of each pixel (step S230), the image processor 120 generates a total brightness distribution histogram by accumulating the adjustment value in each brightness distribution histogram corresponding to the same brightness value. The total brightness distribution histogram indicates the relationship between the brightness values and the accumulated values (step S240). Carrying on with the example above, the following description is based on the example of generating the brightness distribution histograms HTgram1 and HTgram2. Please refer to FIGS. 4B, 5B, and 6A. The image processor 120 accumulates the adjustment values corresponding to the same brightness value in the brightness distribution histograms HTgram1 and HTgram2, to generate the total brightness distribution histogram HTgramAll (as shown in FIG. 6A). For example, the adjustment value of the brightness value 128 is 3+6=9, i.e., accumulating the adjustment values corresponding to the same brightness value 128 in the brightness distribution histograms HTgram1 and HTgram2. For another example, the adjustment value of the brightness value 130 is 6+12=18, i.e., accumulating the adjustment values corresponding to the same brightness value 130 in the brightness distribution histograms HTgram1 and HTgram2.

Figure 6B:
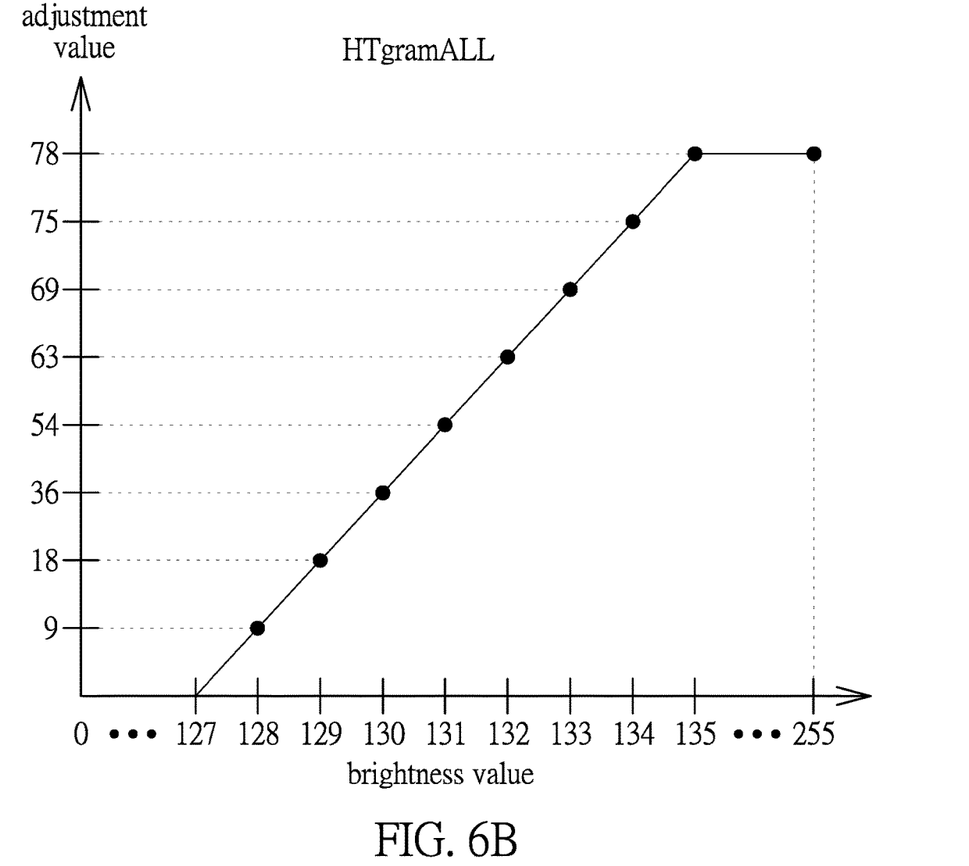
FIG. 6B shows a block diagram of a total brightness distribution histogram of the pixels P12 and P13 according to an exemplary embodiment of the present disclosure.

Next, according to the total brightness distribution histogram, for each brightness value, the image processor 120 sums all adjustment values corresponding to the brightness values equal to and less than the brightness value (step S250). Carrying on with the example above and referring to FIGS. 6A and 6B, in the total brightness distribution histogram HTgramALL, for each brightness value 0-255, the image processor 120 sums all adjustment values corresponding to the brightness values equal to and less than the brightness value, as shown in FIG. 6B. For example, the adjustment value of the brightness value 127 is 0 (i.e, summing the adjustment values corresponding to the brightness values 0-127), and the adjustment value of the brightness value 128 is 9 (i.e, summing the adjustment values corresponding to the brightness values 0-128). For another example, the adjustment value of the brightness value 133 is 69 (i.e, summing the adjustment values corresponding to the brightness values 0-133).

Next, the image processor 120 adjusts a plurality of output pixel values corresponding to the brightness values according to the summed adjustment values, to generate an image histogram. The image histogram indicates the relationship between the brightness values and the output pixel values (step S260). Carrying on with the example above and referring to FIGS. 6B and 6C, the image processor 120 adjusts the output pixel values corresponding to the brightness values 0-255 according to the summed value of the total brightness distribution histogram HTgramALL, to generate the image histogram 300. In the image histogram 300, the abscissa is the brightness values 0-255, and the ordinate is the output pixel values corresponding to the brightness values. For example, the output pixel value corresponding to the brightness value 127 is 255*(0/78)=0; the output pixel value corresponding to the brightness value 130 is 255*(36/78)=118; the output pixel value corresponding to the brightness value 134 is 255*(75/78)=245; and the output pixel value corresponding to the brightness value 135 is 255*(78/78)=255. The image processor 120 can generate the output pixel values corresponding to the brightness values according to the aforementioned adjustment value by another calculation method. The present disclosure is not limited thereto.

Figure 6C:
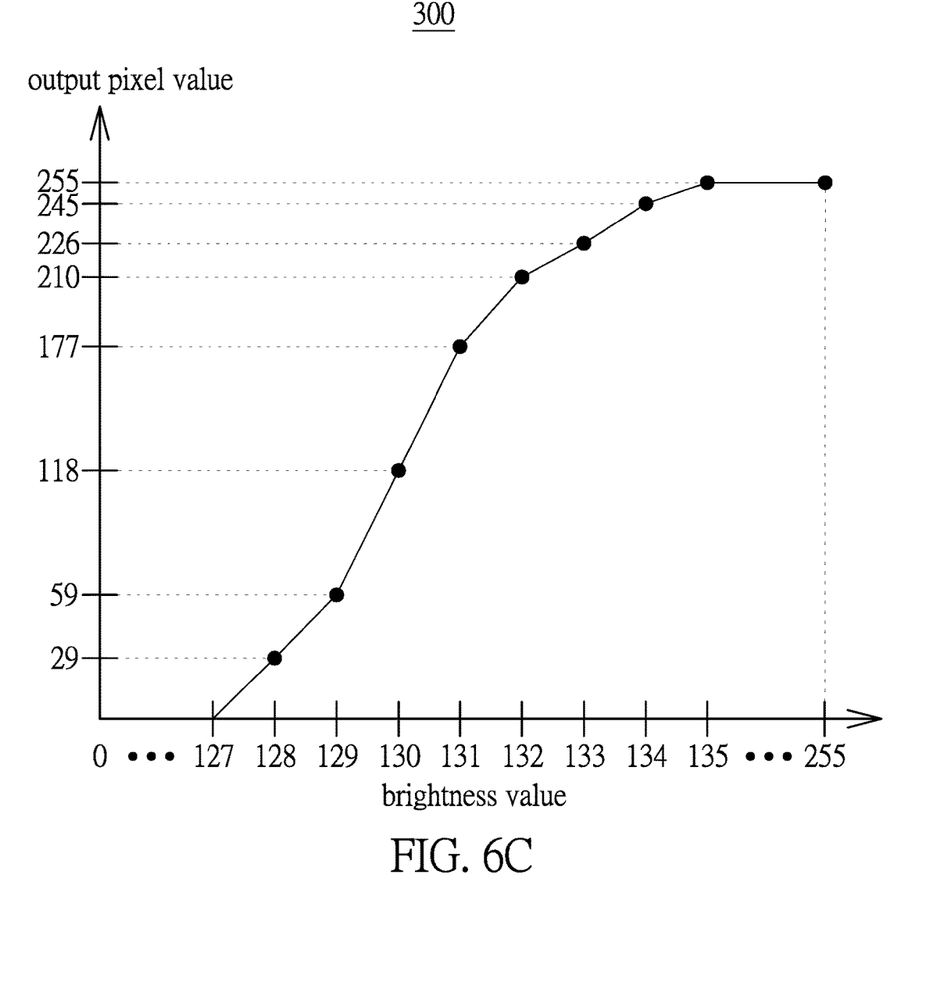
FIG. 6C shows a block diagram of an image histogram of the pixels P12 and P13 according to an exemplary embodiment of the present disclosure.

Lastly, the image processor 120 maps the brightness value of each pixel P0-Pn into one brightness value of the image histogram 300 and then outputs the corresponding output pixel values P0'-Pn' (step S270), as shown in FIG. 6C.

Accordingly, the image contrast enhancement method and the apparatus thereof can enhance the image contrast among the pixels P0-Pn, and can remove phenomenon influencing the clarity in the image (e.g., heavy fog, dust, smoke, or etc).

Figure 7:
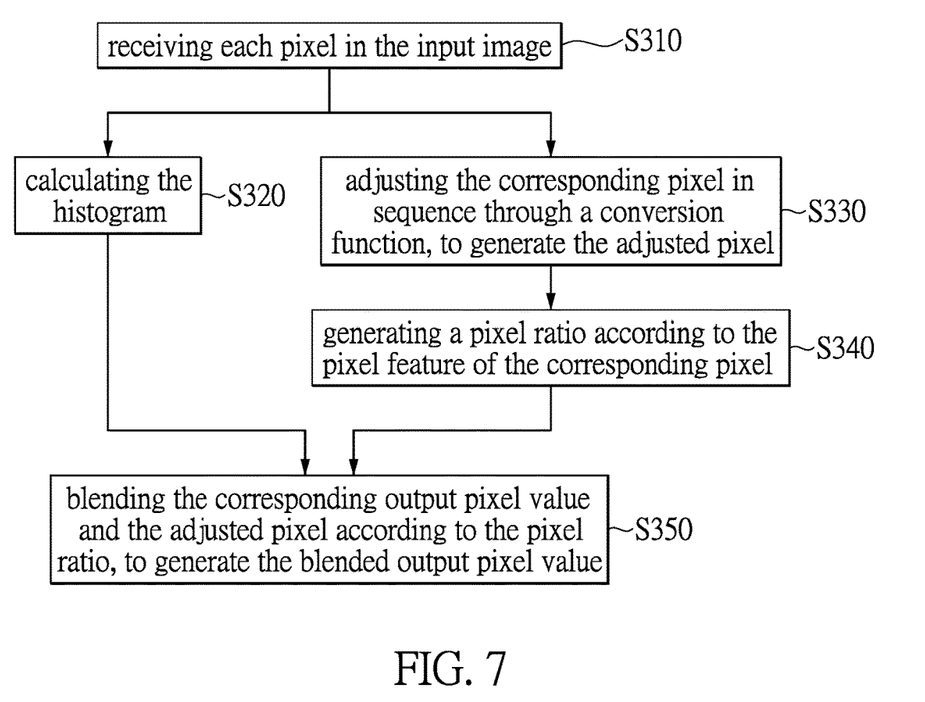
FIG. 7 shows a flowchart of an image contrast enhancement method according to another exemplary embodiment of the present disclosure.

Next, please refer to FIG. 7, which shows a flowchart of an image contrast enhancement method according to another exemplary embodiment of the present disclosure. Compared with the aforementioned embodiment, the image processor 120 executes steps S320 and S330 after receiving each pixel P0-Pn in the input image Fr (step S310).

In step S320, the image processor 120 executes the calculation of the histogram. With respect to the calculation of the histogram are the same as steps S220-S270 of the aforementioned embodiment, so detailed description is omitted. In step S330, the image processor 120 sequentially adjusts the corresponding pixels P0-Pn through a conversion function, to generate the adjusted pixels. The conversion function can be Gamma Correction, Histogram Equalization, Adaptive Histogram Equalization, or other conversion functions which can adjust the pixels P0-Pn, and is not limited thereto.

After step S330, the image processor 120 respectively generates a pixel ratio according to the pixel feature of the corresponding pixel (step S340). More specifically, the pixel feature is the color relationship of the corresponding pixel. Therefore, during the process of generating the pixel ratio, the image processor 120 converts the corresponding pixel into a red pixel, a green pixel, and a blue pixel of an RGB format. The image processor 120 selects a minimum value from the red pixel, the green pixel, and the blue pixel, and then adjusts the minimum value to between 0 and 1 as the pixel ratio. In the present disclosure, the color relationship is a relationship among the red pixel, the green pixel, and the blue pixel of the RGB format, and can be other relations of the RGB format. The present disclosure is not limited thereto.

After getting the pixel ratio (i.e., step S340), the image processor 120 respectively blends the corresponding output pixel value and the adjusted pixel according to the corresponding pixel ratio, to generate the blended output pixel values (step S350). More specifically, the image processor 120 configures a weight of the corresponding output pixel value as the pixel ratio, and configures a weight of the configured output pixel value to be 1 minus the pixel ratio. Next, the image processor 120 calculates a weighted sum of the corresponding output pixel value and the adjusted pixel, to generate the blended output pixel value. The blended output pixel value can be calculated by algorithm (1), as follows.

$$Pi''=\omega*Pi'+(1-\omega)*Pfi, i=0\sim n \qquad \text{algorithm (1)}$$

$Pi''$ is the blended output pixel value. $Pi'$ is the output pixel value. $Pfi$ is the adjusted pixel generated in step S330. $\omega$ is the pixel ratio.

Accordingly, the image contrast enhancement method and an apparatus thereof can adjust the ratio of the output pixel value $Pi'$ and the adjusted pixel $Pfi$ of the blended output pixel value $Pi''$ according to degrees influencing the clarity in the image (e.g., heavy fog, dust, smoke, or etc). When the phenomenon influencing the clarity is larger, the image processor 120 calculates the higher pixel ratio. Conversely, when the phenomenon influencing the clarity is less, the image processor 120 calculates the lower pixel ratio.

In summary, this embodiment provides an image contrast enhancement method and an apparatus thereof, which calculates a degree of influence on the clarity according to features of some phenomena influencing the clarity of the image, such as heavy fog, dust, smoke, or etc., and then adjusts the brightness of the pixels corresponding to the features according to the degree of influence on the clarity, thereby enhancing image contrast and removing the phenomenon influencing the clarity in the image.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image contrast enhancement method, adapted for an image contrast enhancement apparatus, and used for adjusting each pixel in an input image, to enhance the contrast of the input image, the image contrast enhancement method comprising:

receiving each pixel in the input image;

sequentially estimating a degree of low contrast of a corresponding pixel according to a pixel feature of each pixel, and converting the degree of low contrast into an adjustment weight by an increasing function;

calculating a plurality of brightness values and a plurality of adjustment values corresponding to the brightness values for each pixel according to a brightness relationship and the adjustment weight of the corresponding pixel, to generate a brightness distribution histogram of each pixel, wherein the brightness relationship is a relationship of the corresponding pixel and adjacent pixels around the corresponding pixel, and the brightness distribution histogram indicates the relationship between the brightness values and the adjustment values;

generating a total brightness distribution histogram by accumulating the adjustment values corresponding to the same brightness value in each brightness distribution histogram, wherein the total brightness distribution histogram indicates the relationship between the brightness values and the accumulated adjustment values;

according to the total brightness distribution histogram, for each brightness value, summing all adjustment values corresponding to the brightness values equal to and less than the brightness value, and taking a summed result as a summed adjustment value corresponding to the brightness value;

adjusting a plurality of output pixel values corresponding to the brightness values according to the summed adjustment values, to generate an image histogram, wherein the image histogram indicates the relationship between the brightness values and the output pixel values; and mapping the brightness value of each pixel into one brightness value of the image histogram and outputting the corresponding output pixel values.

2. The image contrast enhancement method according to claim 1, wherein the pixel feature is the color relationship between the corresponding pixel and the adjacent pixels around the corresponding pixel, and the step of sequentially estimating the degree of low contrast of the corresponding pixel, further comprises:

converting the corresponding pixel and the adjacent pixels into an RGB format;

selecting a minimum red pixel, a minimum green pixel, and a minimum blue pixel from the corresponding pixel and the adjacent pixels; and selecting a minimum value from the minimum red pixel, the minimum green pixel, and the minimum blue pixel, and taking the minimum value as the degree of low contrast of the corresponding pixel.

3. The image contrast enhancement method according to claim 1, wherein the step of calculating the plurality of brightness values and the plurality of adjustment values of the corresponding brightness values further comprises:

generating a plurality of brightness differences, each brightness difference comprising the corresponding pixel and one of its adjacent pixels, and capturing the brightness value of the corresponding pixel and the brightness value of each adjacent pixel;

in each brightness difference, taking the smaller brightness value as a start value, taking the larger brightness value as an end value, and finding a brightness range formed by the start value and the end value in the brightness distribution histogram; and respectively distributing the adjustment weight of the corresponding pixel to each brightness value in each brightness range.

4. The image contrast enhancement method according to claim 1, wherein after the step of receiving each pixel in the input image, the method further comprises:

sequentially adjusting the corresponding pixel through a conversion function, to generate a plurality of adjusted pixels;

respectively generating a pixel ratio according to the pixel feature of the corresponding pixel; and respectively blending the corresponding output pixel value and the adjusted pixel according to the corresponding pixel ratio, to generate a plurality of blended output pixel values.

5. The image contrast enhancement method according to claim 4, wherein the pixel feature is the color relationship of the corresponding pixel, and the step of respectively generating the pixel ratio further comprises:

converting the corresponding pixel into a red pixel, a green pixel, and a blue pixel of an RGB format; and selecting a minimum value from the red pixel, the green pixel, and the blue pixel, and adjusting the minimum value to be between 0 and 1 as the pixel ratio.

6. The image contrast enhancement method according to claim 4, wherein the step of respectively blending the corresponding output pixel value and the adjusted pixel according to the corresponding pixel ratio further comprises:

configuring a weight of the corresponding output pixel value as the pixel ratio, and configuring a weight of the adjusted pixel to be 1 minus the pixel ratio; and calculating a weighted sum of the corresponding output pixel value and the adjusted pixel, to generate the blended output pixel value.

7. An image contrast enhancement apparatus, used for adjusting each pixel in an input image, to enhance the contrast of the input image, the image contrast enhancement apparatus comprising:

an image capture device, receiving the input image, and capturing a plurality of pixels in the input image;

an image processor, electrically connected to the image capture device, and configured to execute the following steps:

receiving each pixel in the input image;

sequentially estimating a degree of low contrast of a corresponding pixel according to a pixel feature of each pixel, and converting the degree of low contrast into an adjustment weight by an increasing function;

calculating a plurality of brightness values and a plurality of adjustment values corresponding to the brightness values for each pixel according to a brightness relationship and the adjustment weight of the corresponding pixel, to generate a brightness distribution histogram of each pixel, wherein the brightness relationship is a relationship of the corresponding pixel and adjacent pixels around the corresponding pixel, and the brightness distribution histogram indicates the relationship between the brightness values and the adjustment values;

generating a total brightness distribution histogram by accumulating the adjustment values corresponding to the same brightness value in each brightness distribution histogram, wherein the total brightness distribution histogram indicates the relationship between the brightness values and the accumulated adjustment values;

according to the total brightness distribution histogram, for each brightness value, summing all adjustment values corresponding to the brightness values equal to and less than the brightness value, and taking a summed result as a summed adjustment value corresponding to the brightness value;

adjusting a plurality of output pixel values corresponding to the brightness values according to the summed adjustment values, to generate an image histogram, wherein the image histogram indicates the relationship between the brightness values and the output pixel values; and mapping the brightness value of each pixel into one brightness value of the image histogram and outputting the corresponding output pixel values.

8. The image contrast enhancement apparatus according to claim 7, wherein the image processor sequentially adjusts the corresponding pixel through a conversion function to generate a plurality of adjusted pixels, respectively generates a pixel ratio according to the pixel feature of the corresponding pixel, and respectively blends the corresponding output pixel value and the adjusted pixel according to the corresponding pixel ratio to generate a plurality of blended output pixel values.

9. The image contrast enhancement apparatus according to claim 8, wherein the pixel feature is the color relationship of the corresponding pixel, and when the image processor respectively generates the pixel ratio, the image processor converts the corresponding pixel into a red pixel, a green pixel, and a blue pixel of an RGB format, selects a minimum value from the red pixel, the green pixel, and the blue pixel, and adjusts the minimum value to between 0 and 1 as the pixel ratio.

10. The image contrast enhancement apparatus according to claim 8, when the image processor respectively blends the corresponding output pixel value and the adjusted pixel according to the corresponding pixel ratio, the image processor configures a weight of the corresponding output pixel value as the pixel ratio, configures a weight of the configured output pixel value to be 1 minus the pixel ratio, and calculates a weighted sum of the corresponding output pixel value and the adjusted pixel to generate the blended output pixel value.

* * * * *